United States Patent [19]
Longsworth et al.

[11] Patent Number: 5,579,654
[45] Date of Patent: Dec. 3, 1996

[54] CRYOSTAT REFRIGERATION SYSTEM USING MIXED REFRIGERANTS IN A CLOSED VAPOR COMPRESSION CYCLE HAVING A FIXED FLOW RESTRICTOR

[75] Inventors: Ralph C. Longsworth, Allentown, Pa.; Mikhail J. Boiarsky, Moscow, Russian Federation; Ajay Khatri, Bethlehem, Pa.

[73] Assignee: Apd Cryogenics, Inc., Allentown, Pa.

[21] Appl. No.: 496,468

[22] Filed: Jun. 29, 1995

[51] Int. Cl.$^6$ .................................................. F25B 41/06
[52] U.S. Cl. ........................... 62/511; 62/470; 62/513; 165/58; 165/201
[58] Field of Search ................... 62/6, 84, 498, 62/511, 513, 468, 470; 165/58, 14

[56] References Cited

U.S. PATENT DOCUMENTS

| | | | |
|---|---|---|---|
| 3,836,779 | 9/1974 | Bruno | 62/51.1 |
| 4,094,169 | 6/1978 | Schmerzler | 62/498 |
| 4,793,150 | 12/1988 | Wattley et al. | 62/511 |
| 4,949,546 | 8/1990 | Klusmier et al. | 62/6 |

*Primary Examiner*—Ronald C. Capossela
*Attorney, Agent, or Firm*—Helfgott & Karas, P.C.

[57] ABSTRACT

A closed cycle cryogenic refrigerating system with a fixed restrictor operates with a compressor inlet pressure in a range of 0.1 Mpa to 0.4 Mpa and compressor discharge pressure in a range of 1.5 Mpa and 2.5 Mpa. A basic cryogenic refrigerant mixture is used to which is added approximately 3% to 25% of helium, hydrogen and/or neon. A ratio of refrigerant density at the inlet of the fixed restrictor between steady-state operation and operation at the beginning of cool-down is in an approximate range of 7 to 17. Relatively rapid cool-down is achieved and evaporator temperature is maintained in an approximate range of 70K to 120K.

22 Claims, 13 Drawing Sheets

COMPARISON OF CYCLE EFFICIENCY AND HIGH PRESSURE DENSITY RATIO FOR ALFEEV et al. PATENT AT THEIR 5 MPa AND OUR 2 MPa. 0.1 Mpa RETURN PRESSURE

| MIXTURE No. | MIXTURE COMPOSITION - % | | | | | | | |
|---|---|---|---|---|---|---|---|---|
| | 1 | | 2 | | 3 | | 4 | |
| Neon | - | | - | | - | | 20 | |
| Nitrogen | 40 | | 30 | | 30 | | 25 | |
| Methane | - | | 35 | | 30 | | 25 | |
| Ethane | 30 | | 35 | | 20 | | 15 | |
| Propane | 30 | | - | | 20 | | 15 | |
| SUPPLY PRESSURE - MPa | 5 | 2 | 5 | 2 | 5 | 2 | 5 | 2 |
| MIN. TEMPERATURE - K | 78 | 78 | 81 | 80 | 80 | 80 | 67 | 67 |
| LOAD TEMPERATURE - K | 78 | 78 | 92 | 82 | 99 | 80 | 71 | 70 |
| REFRIG. FOR 1 Mole/s - W | 9.4 | 4.8 | 12 | 4.5 | 17 | 6.1 | 5.6 | 3.6 |
| IDEALIZED EFF. - % | 30 | 19 | 29 | 16 | 37 | 23 | 19 | 16 |
| HIGH PRESSURE DENSITY RATIO | 6.8 | 23.3 | 10.7 | 30 | 9.25 | 25.7 | 7.6 | 11.0 |

| DENSITY RATIO OF MIXTURES AT 2 MPa | | | | | | |
|---|---|---|---|---|---|---|
| MIXTURE | 5 | 6 | 7 | 8 | 9 | 10 |
| N2 | 0.45 | 0.30 | 0.15 | | 0.35 | 40 |
| Ar | | | 0.25 | 0.40 | | |
| CH4 | 0.19 | 0.15 | 0.10 | 0.10 | 0.15 | 20 |
| C2H6 | 0.14 | 0.22 | 0.20 | 0.10 | 0.20 | 20 |
| C3H8 | 0.22 | 0.23 | 0.15 | 0.15 | 0.30 | 20 |
| C4H10 | | 0.10 | 0.15 | 0.15 | | |
| He - % | DENSITY RATIO | | | | | |
| 0.0 | 27.5 | 20.5 | 23.0 | 22.8 | 21.9 | 22.8 |
| 1.5 | 18.9 | 14.3 | 18.6 | 18.9 | 16.5 | 18.6 |
| 3.0 | 15.0 | 11.8 | 16.1 | 16.2 | 13.8 | 15.3 |
| 5.0 | 13.2 | 10.3 | 14.1 | 13.9 | 11.9 | 13.1 |
| 10.0 | 10.9 | 9.8 | 11.6 | 11.1 | 10.2 | 11.0 |
| 15.0 | 9.9 | 9.2 | 9.5 | 9.7 | 9.5 | 10.0 |
| 20.0 | 9.4 | 6.7 | 8.0 | 9.0 | 9.8 | 10.2 |

| DENSITY RATIO OF MIXTURE #11 AT 2 MPa | | |
|---|---|---|
| MIXTURE | 11 | |
| Ar | 0.43 | |
| CH4 | 0.17 | |
| C2H4 | 0.17 | |
| C4H10 | 0.22 | |
| He - % | Den' | % LIQ |
| 0.0 | 21.6 | 8.0 |
| 1.5 | 18.5 | 7.5 |
| 3.0 | 15.8 | 7.0 |
| 5.0 | 13.7 | 6.4 |
| 10.0 | 11.1 | 4.8 |
| 15.0 | 10.0 | 3.5 |
| 20.0 | 9.3 | 2.2 |

FIG. 11

| BASE GASES | |
|---|---|
| NITROGEN | N2 |
| C MONOXIDE | CO |
| ARGON | Ar |
| OXYGEN | O2 |
| METHANE | CH4 |
| KRYPTON | Kr |
| | |
| MIDDLE GASES | |
| R14 | CF4 |
| ETHYLENE | C2H4 |
| ETHANE | C2H6 |
| R13 | CClF3 |
| | |
| HIGH GASES | |
| R13-Br | CClF2Br |
| PROPYLENE | C3H6 |
| PROPANE | C3H8 |
| R22 | CHClF2 |
| R218 | C3F8 |
| R12 | CCl2F2 |
| I-BUTANE | C4H10 |
| I-PENTANE | C5H12 |

| MIXTURE | 12 | 13 |
|---|---|---|
| He | 4.0 | 4.5 |
| N2 | | |
| Ar | 20.4 | 21.5 |
| CH4 | 25.2 | 26.4 |
| C2H6 | 18.2 | 17.6 |
| C3H8 | 32.5 | 30.0 |
| C4H10 | | |
| TOTAL % | 100.0 | 100.0 |
| BASIC % | 96.3 | 95.5 |
| CDT - min | 35 | 33 |

CRYOSTAT REFRIGERATION SYSTEM USING MIXED REFRIGERANTS IN A CLOSED VAPOR COMPRESSION CYCLE HAVING A FIXED FLOW RESTRICTOR

BACKGROUND OF THE INVENTION

This invention relates generally to a cryogenic refrigeration system and cryostat, and more particularly to a cryogenic system operating within a range of temperatures from 70K to 120K, using mixed refrigerants in a closed circuit including a vapor compressor, a counter flow heat exchanger, and a throttle device to provide refrigeration effect for a low temperature evaporator.

Where a refrigerating system is intended to provide very low temperatures in the cryogenic range, such as between 70K and 120K, the refrigerants comprise cryogenic gases usually having boiling temperatures below 125K, such as nitrogen, which has a normal boiling temperature of 77K at one standard atmospheric pressure, or argon, which has a normal boiling temperature of 87K, or methane which has a normal boiling temperature of 112K. These cryogenic gases have typically required the use of very high pressure gas systems involving specially designed multi-stage compressors. Such systems are expensive to manufacture and operate, and require frequent maintenance.

In order to provide cryogenic systems which are less costly and more efficient, numerous mixed gas refrigerants have been proposed for use within the cryogenic temperature range. These mixed refrigerants typically combine standard well known cryogenic refrigerant components such as nitrogen, argon or methane, and also include additional components such as ethane, propane or isobutane, in various combinations. Each of these mixtures provides a specific arrangement of components with specified percentages of the various ingredients.

However, while significant improvements have been made by using mixed refrigerants, problems still exist with the multi-component refrigerant mixtures.

For example, steady state operation of a cryostat generally provides a constant thermal load on the refrigeration system. Once attained, the desired steady state temperatures are maintained when operating within the design capacity of the compressor. However, during a transient thermal load condition on the system, such as during cool-down from room temperature to the desired steady operating temperature, the rapidity of cool-down has been limited. Intermediate cooling steps are sometimes provided for accelerating cool-down before the steady-state vapor compressor cycle takes over. Still, there is a wide range of cooling capacity requirements and rapid cool-down requires modification of the system between the cool-down and steady-state modes.

Figure 1:
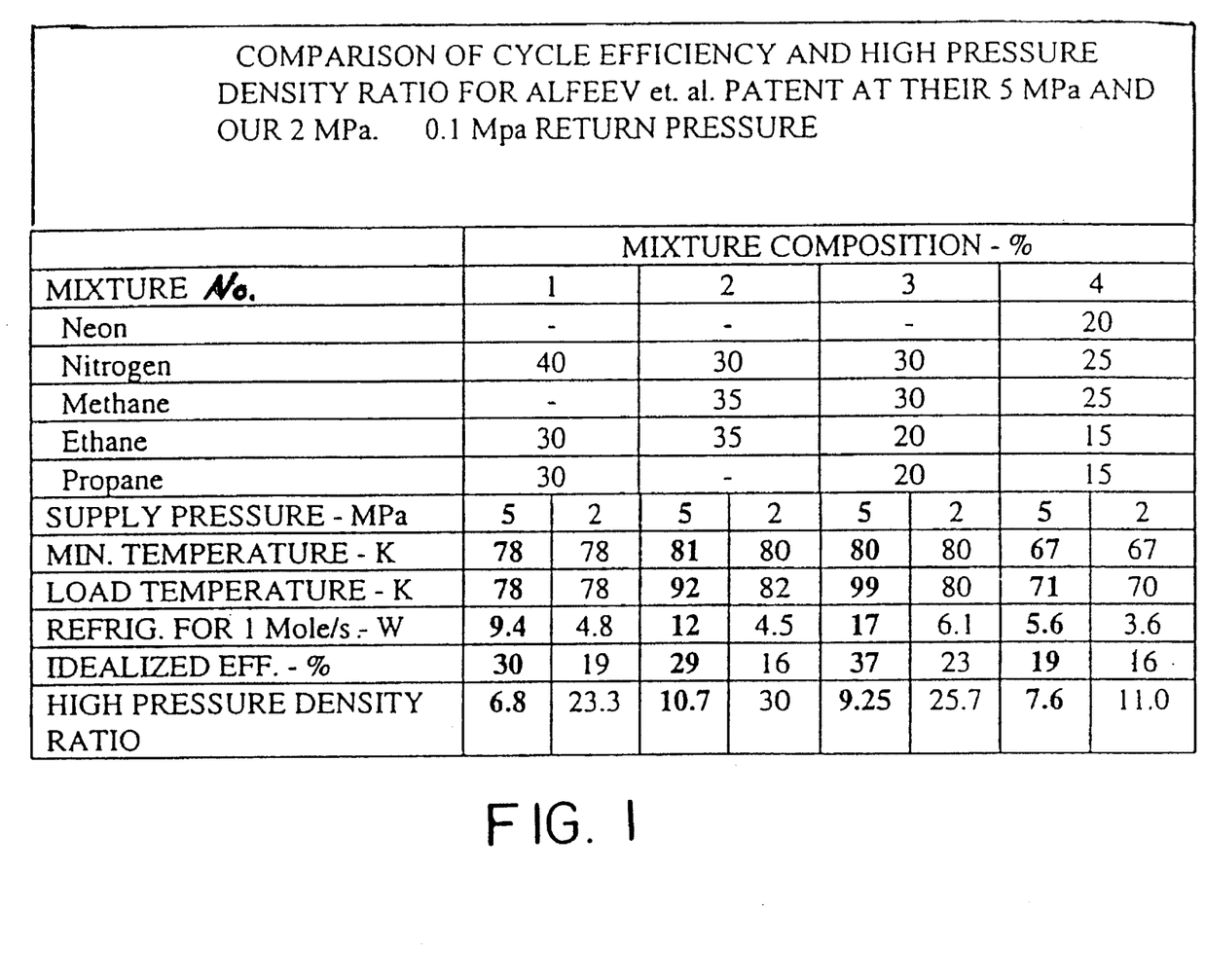
FIG. 1 is a tabulation of comparative data for refrigeration cycles at different high side pressures.
Figure 2:
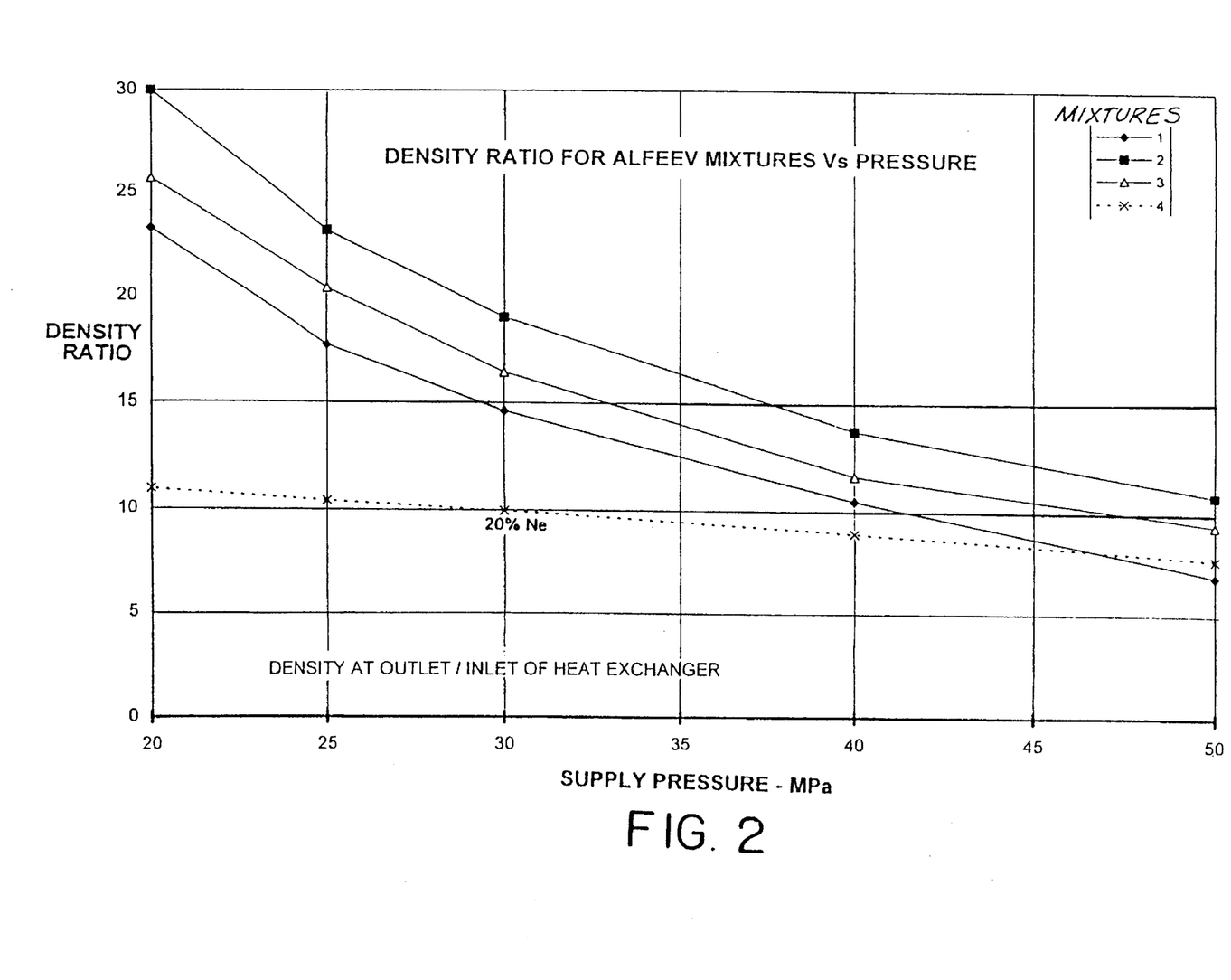
FIG. 2 is a graph of density ratio versus supply (high side) pressure based on the data of FIG. 1.

In closed cycle vapor compression systems for cryogenic cooling, lower supply pressures, i.e., compressor discharge pressure, are used to permit the use of a single stage compressor. However, such low pressure refrigerators have problems that were not apparent with earlier operations at higher pressures. For example, FIGS. 1 and 2 show refrigeration cycle efficiencies using refrigerant mixtures that have been recommended for operation at compressor supply pressures above 5 Mpa. Efficiencies are greatly reduced if the same refrigerant mixture is used in a system operating at 2.5 Mpa and below at compressor discharge. Mixtures 1, 2 and 3 in FIGS. 1 and 2 represent mixtures of basic components nitrogen, methane, ethane and propane in various proportions as disclosed in British patent No. 1336892 to Alfeev et al. (Nov. 1993).

A further problem in working at compressor discharge pressures less than 2.5 Mpa is that mixtures of the prior art require a variable restrictor device to achieve cool-down from ambient temperatures to steady state cryogenic refrigerating temperatures in a minimum time. It is necessary to adjust the restrictor setting so as to reduce refrigerant flow and achieve lower operating temperature during steady state, as compared to the restrictor setting for reasonably fast cool-down.

Therefore, it has been necessary in the prior art, wherever practical experience has made operators knowledgeable of the problem, to use an adjustable throttle device. Then, at one setting of the throttle device cool-down is effected, and at a different setting of the throttle device that provides a greater refrigerant flow restriction, steady state operation is effected.

Generally, in prior art publications, the problem of disparate thermal load is not recognized and is not addressed. Many cycles described and illustrated in such publications on a predictive basis, in actuality will be inoperative or impractical if an adjustable expansion device is absent, because of the extended time period which will be necessary to cool the cryostat to the desired temperature before steady state operation commences.

Throttle devices are generally made adjustable in capacity by providing a flow path that is variable in flow resistance, e.g., the flow area is varied when an orifice is used. To accomplish this variability, throttle devices have been fabricated of materials with different coefficients of thermal expansion such that there is relative motion between elements, which varies flow area, as the operating temperature of the throttle device drops. Thus, the throttle device becomes complicated. The need for an automatic mechanical device to track a changing thermal load reliably and rapidly come to rest at the desired steady state operating conditions, provides many difficulties in constructing an automatic expansion device.

Externally adjustable devices, e.g., manual, may also be used. However, precision control of orifice size is difficult and heat leakage problems are exacerbated when control elements must be made accessible outside the cryostat. Separate restrictors, one for cool-down and another for steady state operation, have also been used.

What is needed is a refrigeration system for a cryostat that takes advantage of refrigerant mixtures to improve efficiency, and accommodates both cool-down and steady state operating loads using a fixed throttle device, such as an orifice or capillary tube, which has no moving parts.

SUMMARY OF THE INVENTION

Accordingly, it is an object of the present invention to provide an improved refrigerating system for cryogenic temperatures that provides a rapid cool-down to steady state operating conditions.

Another object of the invention is to provide improved mixed gas refrigerants which operate a cryostat in a closed vapor compression cycle using an expansion device without moving elements.

Yet another object of the invention is to provide an improved refrigeration system with a fixed flow restrictor that provides a full range of capacities and refrigerating temperatures.

In accordance with the invention, lighter gas components having lower boiling point temperatures, are added to more conventional refrigerant mixtures having basic components. Selected proportions of the lower boiling components reduce density changes that occur in the refrigerant entering the expansion device as the cycle moves from a start-up/cool-down operating phase to a steady-state operating phase.

These lighter gas elements are added to the basic mixtures that provide a gas at the inlet of the expansion device (i.e., a restrictor) at start up, and a liquid at the restrictor inlet during steady state operation. It has been found that by reducing these density changes, a fixed expansion device, i.e., an orifice, a valve which has been set, a heat exchanger tube pinched at its end, or a capillary tube can be effectively used in a refrigeration cycle to provide a cool-down of reasonable duration followed by efficient steady state operation at cryogenic refrigeration temperatures. Neon, hydrogen and helium are examples of lighter refrigerant gases that can be added to more conventional basic refrigerant mixtures to achieve the desired results.

Addition of such lower boiling components as neon, hydrogen and helium, has been known for the purpose of reducing refrigerant cycle operating temperatures. However, use of these components as additions to basic refrigeration mixtures has heretofore not been known or practiced for the purpose of achieving rapid cool-down to low stabilized operating temperatures, while using a fixed restrictor for both cool down and steady-state operation. Without addition of these lower boiling elements, the basic mixtures require a variable throttle valve to achieve acceptable cool-down time at supply pressures less than 2.5 Mpa.

In studying the problem, the inventors have concluded that the density of the gas entering the throttle device at the start of cool-down at 2.5 Mpa is only about half the density at 5 Mpa. The density of the liquid entering the throttle device after cool-down is completed is about the same at the two pressures. As a result, a mass flow rate of refrigerant for a fixed orifice and constant supply pressure will change twice as much during cool-down at 2.5 Mpa as it will change during cool-down at 5 Mpa.

FIG. 1, also includes calculated values of the density values for four mixtures Nos. 1–4 claimed in the prior art British patent to Alfeev at compressor supply pressures of 5 Mpa and 2 Mpa. These ratios are illustrated as a function of supply pressure in FIG. 2, wherein the density ratio falls in a range of 6 to 11 for mixtures Nos. 1–4 at 5 Mpa. Mixtures Nos. 3 and 4 are similar except that neon has been added to mixture No. 4 to represent approximately molar 20%. Good cool-down performance was found with a fixed restrictor (an orifice) at a pressure of 5 Mpa.

However, at 2 Mpa, mixtures Nos. 1–3 with density ratios in the range from 23 to 30, would have extremely slow cool-down unless some type of variable refrigerant flow restrictor were used with settings providing less restriction during cool-down than during steady state operation.

Mixture No. 4 to which 20% neon was added, had good cool-down characteristics at both 2 Mpa and 5 Mpa without use of an adjustable restrictor. At 2 Mpa, the pressure density ratio was calculated at 11, which is very close to the range of density ratios for mixtures Nos. 1–3 operating at 5 Mpa.

Thus, lower operating temperatures are achieved, and a need for a variable restrictor to achieve efficient cool-down is eliminated by adjusting the basic components of a refrigerant mixture to bring the density ratio into a preferred range at low operating pressures.

Figure 3:
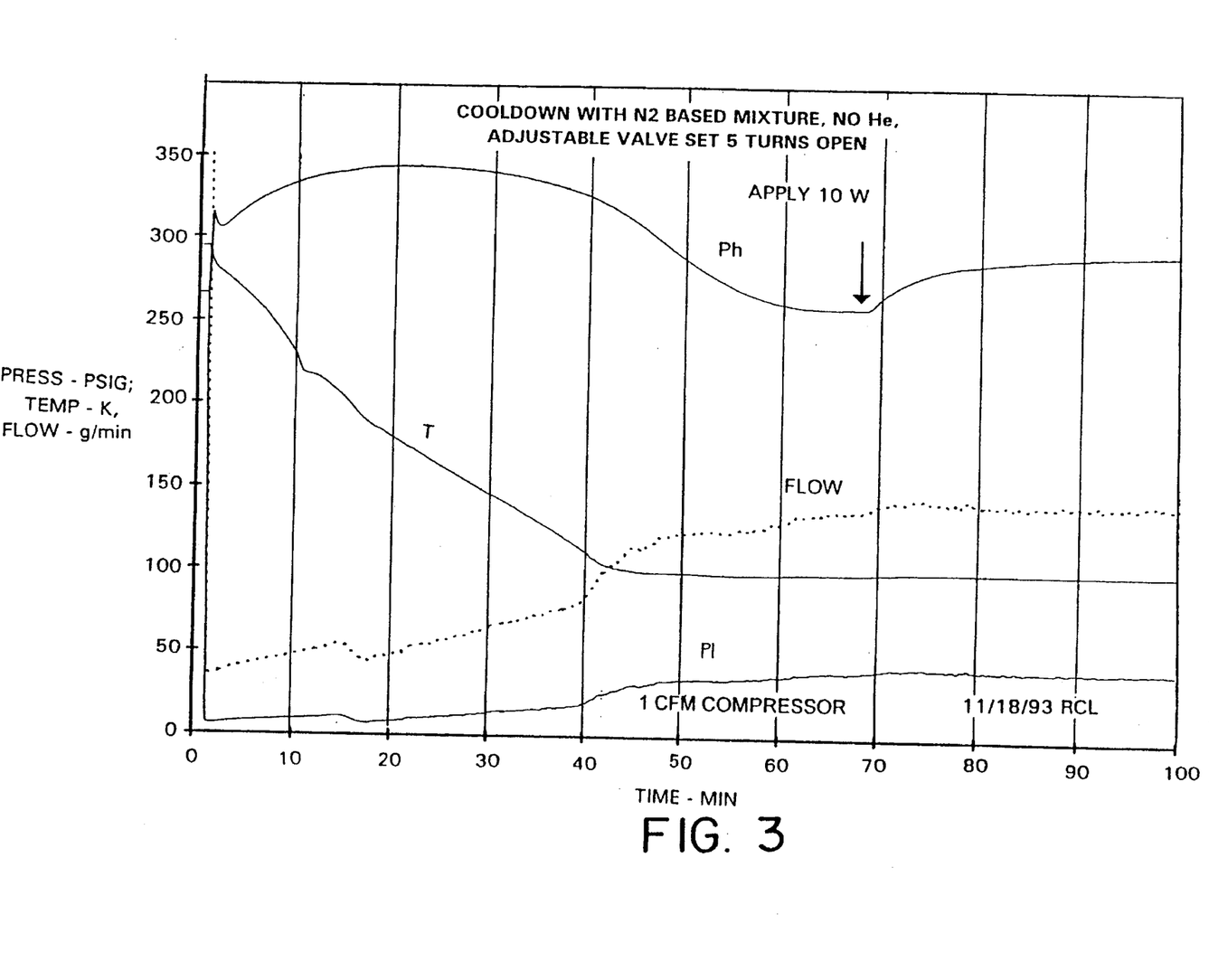
FIG. 3 provides refrigeration cool-down test results for a nitrogen based refrigeration mixture without helium.

FIG. 3 illustrates performance of a refrigerant system using a nitrogen based refrigerant mixture that has not been modified by addition of a lower boiling temperature component such as helium, hydrogen or neon. Compressor discharge pressure Ph, evaporator temperature T and refrigerant flow rate (grams per minute) are illustrated during and shortly after cool-down. A time of 43 minutes to reach 100K from a starting temperature near 300K with an adjustable restrictor valve, fixedly set five turns open, is only a few minutes longer than a minimum time that can be achieved by adjusting the valve during cool-down.

After cooling to 100K, another 20 minutes was required for the system to reach equilibrium. During that time, liquid refrigerant builds up on the high pressure side of the refrigeration system. When a 10 watt heat load was applied after about 68 minutes, some of the liquid refrigerant on the high pressure side of the system evaporated as the supply pressure from the compressor increased. The mass flow rate increased from approximately 40 grams per minute to 145 grams per minute during cool-down and the inlet pressure P1 increased from 6 psig to 40 psig.

The relatively high steady state temperature of 100K was the result of the refrigerant mixture that lacked a light gas fraction. Other factors being equal, in order to reduce the operating temperature after cool-down, it is necessary to reduce the size of the throttle orifice. Reducing the size of the orifice reduces the temperature but also reduces refrigerant flow rate and thus the maximum rate of refrigeration effect that can be produced is reduced.

Nitrogen based refrigerant mixtures are improved by adding helium, hydrogen and/or neon in the range of 3%–25% of the new mixture. Argon based refrigerant mixtures are improved by adding helium, hydrogen, nitrogen and neon in the range of 3%–25% of the new mixture. All percentage values stated in describing the present invention herein represent molar fractions.

The compressor in this system has a volumetric efficiency in excess of 0.4 when operating at a pressure ratio in a range of 5 to 6. Maintenance of compressor inlet pressure above 0.1 Mpa (1 Atm) and below 0.4 Mpa (4 Atm) is appropriate for system performance over the capacity range from cool-down operation to steady-state operation, while using a fixed restrictor in the cycle. Generally, a refrigerant density ratio of 7 to 17 is desirable from compressor discharge to restrictor inlet when operating with 290K ambient and holding a 70K–120K cold temperature. In this density range effective cool-down is achieved without employing a variable restrictor.

A good counter flow regenerative heat exchange between refrigerant flowing to a restrictor and the same refrigerant exiting the evaporator of a closed cycle, is essential for good cycle efficiency.

The invention accordingly comprises the features of construction, combinations of elements and arrangement of parts, which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF PREFERRED EMBODIMENTS

Figure 4:
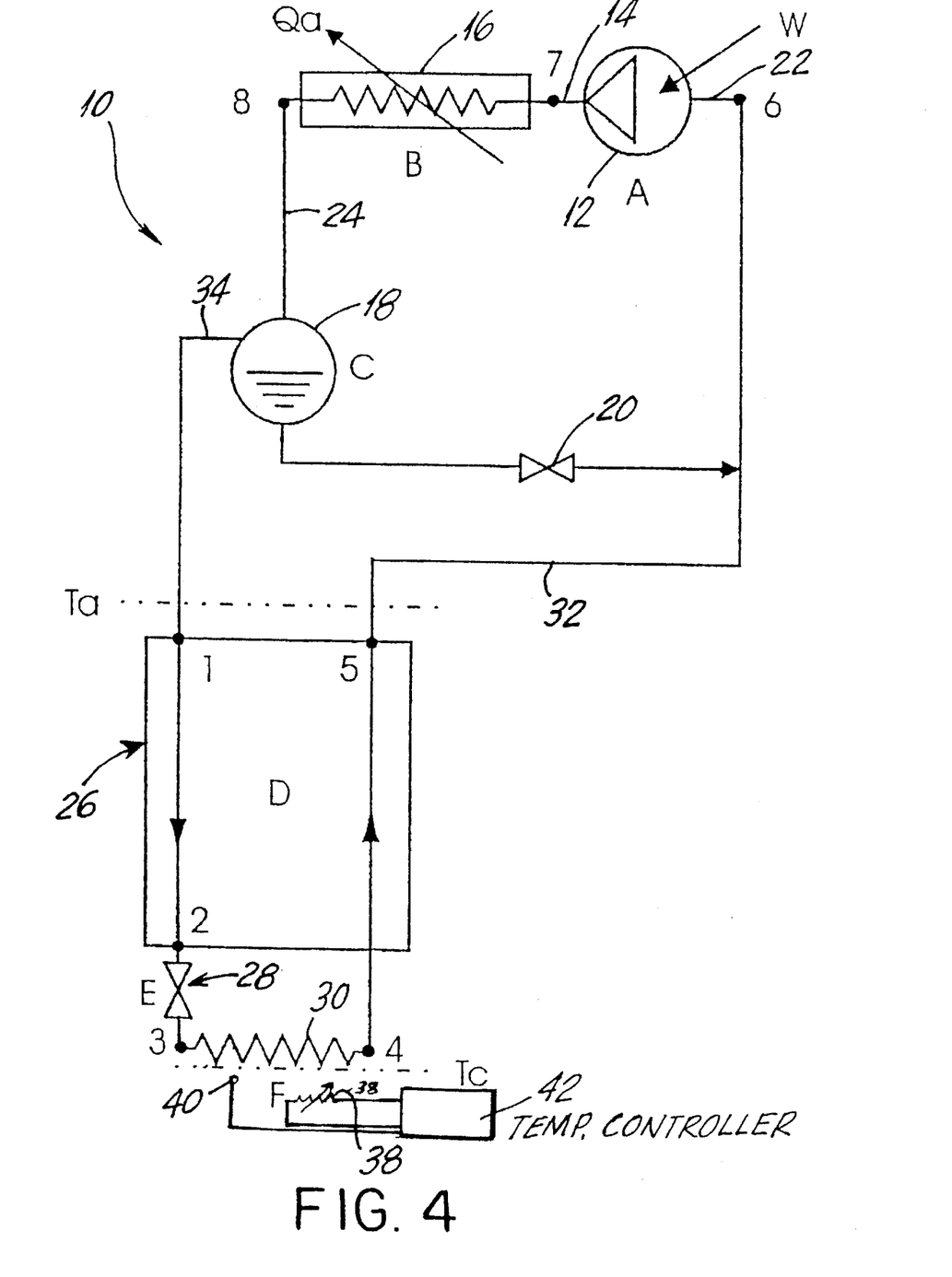
FIG. 4 is a schematic of a single stage cryogenic refrigeration system in accordance with the invention.
Figure 5:
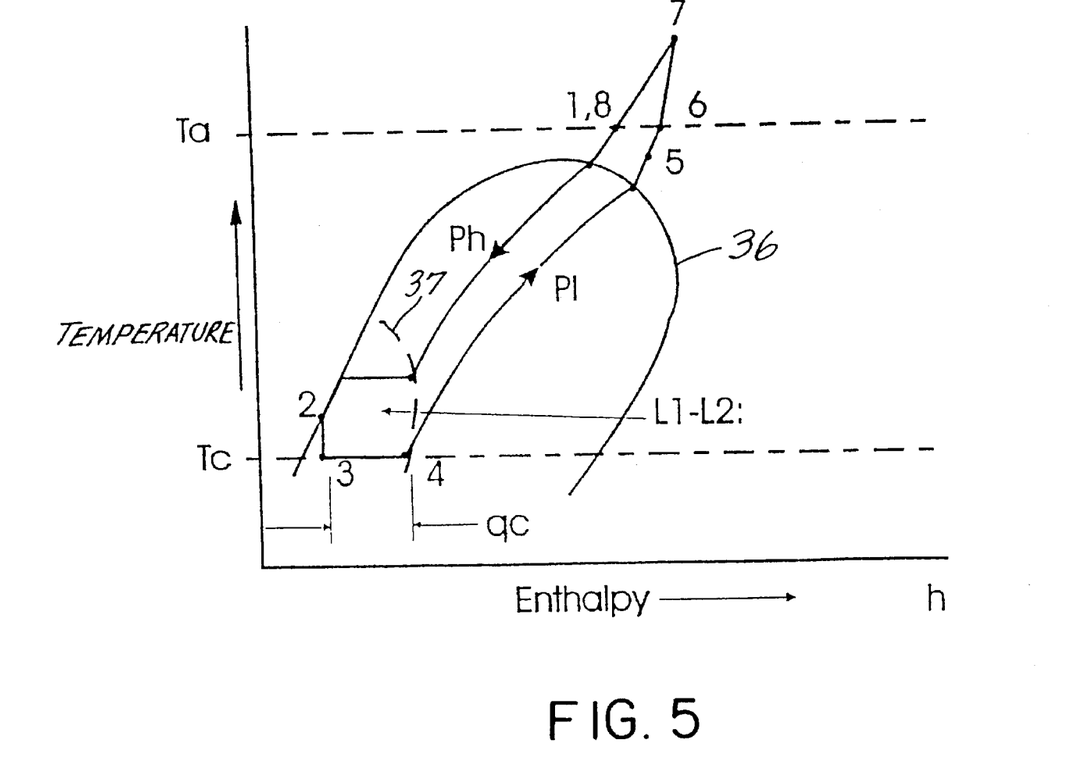
FIG. 5 is a temperature-enthalpy diagram of the refrigeration cycle in accordance with the invention.

With reference to FIGS. 4 and 5, a refrigerator 10 in accordance with the invention, using an enhanced refrigerant mixture, is illustrated. The refrigerator 10 utilizes a typical compressor 12 connected at its discharge or high pressure end 14 to an after-cooler 16 having its outlet connected to an oil separator 18. Oil from the oil separator 18 flows by way of a throttle valve 20 to the low side 22 of the compressor 12.

The outlet 24 of the after-cooler 16 also connects to the high pressure inlet side of a regenerative heat exchanger 26. The outlet from the regenerative heat exchanger 26 connects to the inlet of an expansion device 28, for example, a fixed orifice, a valve with a fixed setting, a pinched tube of the heat exchanger, or a capillary tube. An evaporator 30 connects between the outlet of the expansion device 28 and the low pressure side of the regenerative heat exchanger 26. The low pressure discharge end 32 of the regenerative heat exchanger 26 connects to the low pressure inlet 22 of the compressor 12 to complete the cycle.

The oil separator 18 is used downstream of the compressor 12 so as to remove liquid oil, pumped by the compressor as a lubricant, from the refrigerant flow stream that passes ultimately through the evaporator 30. Excess amounts of oil in the evaporator 30 affect heat transfer in the evaporator and would diminish the capacity of the cycle.

In operation, the compressor 12 receives from the evaporator 30 a refrigerant of mixed gases and entrained oil at its low pressure inlet 22, and discharges compressed gas and entrained oil at its high pressure discharge 14. The compressed gas is passed to the inlet of the after-cooler 16, which may be air (ambient) or water cooled and functions to remove heat, including the heat of compression, from the compressed gas mixture.

The output from the after-cooler 16 passes along the line 24 to the oil separator 18, which may be a simple gas-liquid filter. The oil separator 18 receives the compressed gas mixture and entrained oil, and functions to separate the oil from the gas. Such separators are known in the art and, therefore, are not described in detail herein. Oil is delivered as a liquid from the low end 32 of the oil separator 18 to the low pressure or suction inlet 22 of the compressor 12 by way of the throttle valve 20. The compressed refrigerant gas that enters the oil separator, leaves the oil separator at the high side 34 and flows to the high pressure inlet of the regenerative heat exchanger 26, where it is further cooled by a counter flow of refrigerant gas, as explained hereinafter.

The refrigerant mixture leaving the high pressure side of the regenerative heat exchanger 26 enters the expansion device 28 as a liquid, gas, or two-phase mixture, and expands to a lower pressure as it flows through a restriction of the expansion device 28. As the refrigerant flows through the expansion device 28, its temperature drops and it enters the evaporator 30 at a low temperature, sufficiently low to cool a load (not shown) that is placed on the evaporator 30. As is known in the cryogenic arts, the load is frequently enclosed in a vacuum insulated cryostat.

The refrigerant mixture leaving the evaporator 30 is a two-phase mixture of liquid and gas. This discharge from the evaporator 30 flows through the low pressure side of the regenerative heat exchanger 26 in counter-flow heat exchange relationship with the flow of gas from the after-cooler 16 toward the expansion device 28, as described. Thus, the low pressure two-phase gas/liquid is heated until all of the liquid has evaporated. Then it is superheated in its return to the inlet 22 of the compressor 12, while at the same time the flow of gas, liquid or two-phase refrigerant to the expansion device 28 is further cooled.

FIG. 5 is a temperature-enthalpy diagram of the refrigeration cycle representing an aggregation of the properties of a refrigerant mixture such as mixtures #3 of FIG. 1. Thus, within the dome 36 of the refrigerant characteristic, where for a single component (pure) refrigerant, constant pressure would represent a constant temperature, for the refrigerant mixture, temperatures vary along a line representing constant pressure.

Reference numerals 1–8 are used in FIGS. 4 and 5 to indicate the thermodynamic conditions at different points in the physical apparatus illustrated in FIG. 4. In both figures, the coldest refrigerant temperature Tc (3, 4) occurs in the evaporator 30; the highest temperature 7 occurs at the discharge 14 from the compressor 12, and ambient temperature Ta is shown in both figures. Thus, as the highest temperature 7 exceeds ambient temperature, the possibility of using ambient air or water as coolant for the after-cooler 16 is available in designing a system.

A compressor suitable for such applications is found in U.S. Pat. No. 5,337,572, issued Aug. 16, 1994, to the assignee of this application. This patent is incorporated by reference into the present application. However, it should be noted that the present application is not limited to the compressor or type of compressor described in the patent. The present invention is applicable to other compressor systems that are capable of compressing gas mixtures of the types described from about 0.1 Mpa–0.4 Mpa on the low side of the compressor 12 to 1.5 Mpa–2.5 Mpa on the discharge side of the compressor 12.

In the prior art, a designer operating a system at 1.5 Mpa–2.5 Mpa, and desirous of using a fixed restrictor in a system with a basic refrigerant mixture, must choose (a) either a sufficiently large orifice in the restrictor to cool down reasonably fast, with a resultant relatively high pressure/high Cryogenic temperature in the evaporator 30 after cool-down, or (b) a reduced size of the orifice, with an attendant slow cool-down, but a reasonably low pressure/low cryogenic temperature of the evaporator 30 after cool-down.

In accordance with the invention, the disadvantage incurred with a fixed orifice, that is, a compromise in size of the orifice, is substantially overcome by refrigerant gas mixtures that have certain characteristics. Using these novel gas mixtures with a selected fixed restrictor can provide a cool-down time which is almost as fast as the fastest that can be achieved with a variable restrictor. Minimum temperatures in the evaporator and maximum capacity are similar to those obtained with the basic refrigerant mixture.

In accordance with the invention, the change of density of the refrigerant at the inlet to the restrictor during cool-down is kept to a value less than about 17. Then, cool-down time, with a fixed orifice, is within 1.5 times the minimum cool down time that is possible in a given system. The change of density at the throttle valve during cool-down is reduced by adding helium, hydrogen and/or neon to a basic refrigerant mixture. A basic mixture is one that provides 100% liquid at the restrictor inlet during steady state performance.

This change of density, herein called "density ratio", is the ratio of the density of the liquid refrigerant after cool-down at the inlet to the fixed restrictor to the density of the gaseous refrigerant entering the high pressure side of the heat exchanger. Stated otherwise, the density of the refrigerant at the inlet to the fixed restrictor varies from the density of the refrigerant gas at start-up of the system to the density of the liquid that is present at the inlet of the restrictor after cool-down.

With a density ratio less than about 17, the mass flow rate during cool-down does not change as much and the pressure after cool-down is lower in the evaporator 30, as compared to systems using basic refrigerants without addition of the lower boiling elements helium, hydrogen and/or neon. The addition of as little as 3% helium, hydrogen and/or neon to the mixture provides a lower return pressure and a lower temperature in the evaporator after cool-down.

Figure 6:
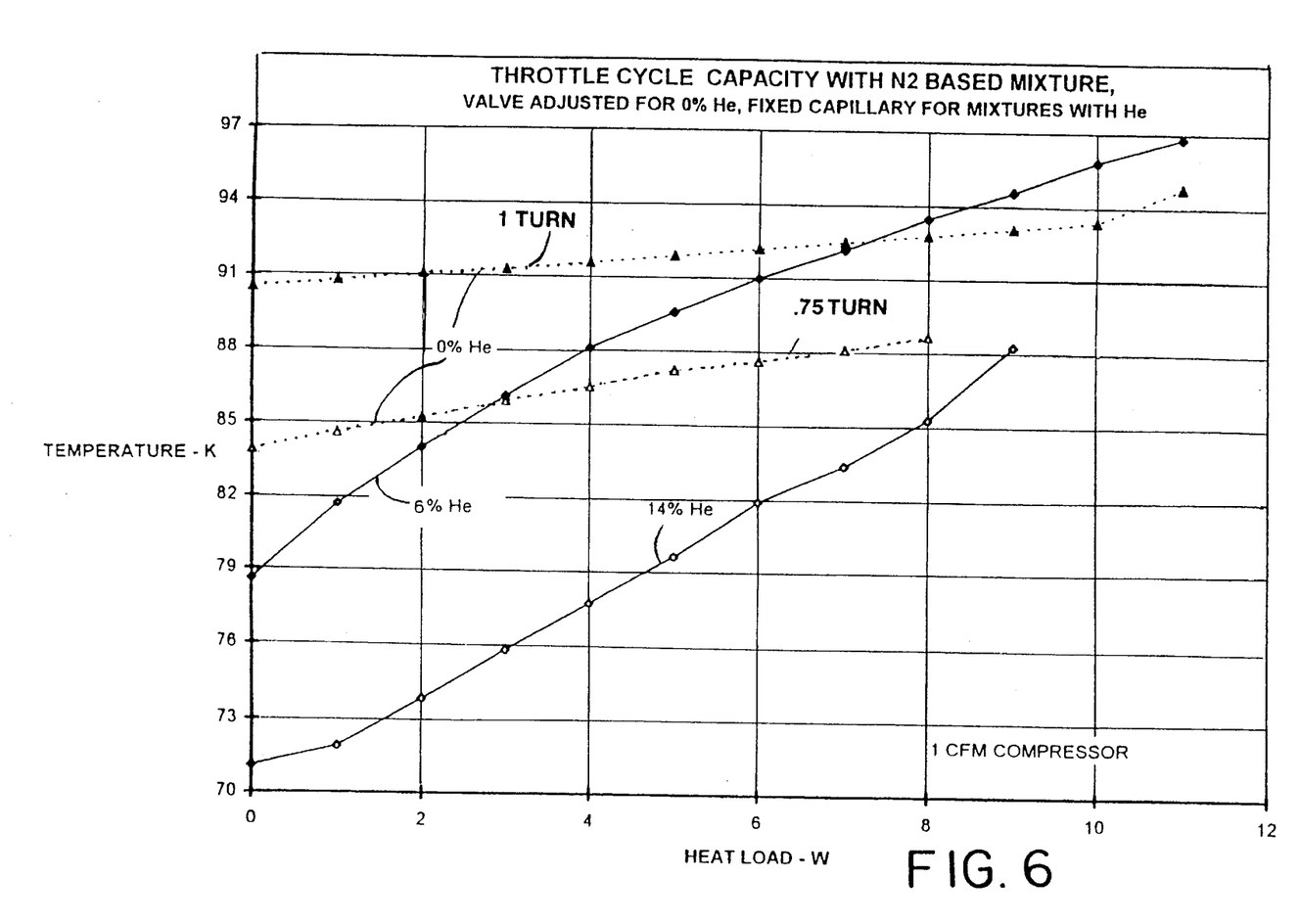
FIG. 6 is a graph of evaporator temperatures versus heat load for nitrogen based mixtures.

FIG. 6 illustrates the evaporator temperatures held by a given refrigeration cycle versus the heat load applied under steady-state conditions. The solid lines indicate performance for a nitrogen based mixture to which helium has been added for the purpose of bringing the density ratio within the desired range. Addition of 6% helium results in a generally higher refrigeration capacity than a 14% helium mixture, albeit at the expense of higher evaporator temperatures.

The data in the broken lines is for the basic refrigerant mixture without addition of helium. A flatter temperature versus load characteristic is achieved which may be of value in certain applications. The broken-line upper curve represents a larger restrictor orifice; the system operates at higher evaporator temperatures than does the system of the lower broken-line curve having a more restricted orifice. However, the higher temperature, larger orifice construction is capable of greater cooling capacity.

Figure 7:
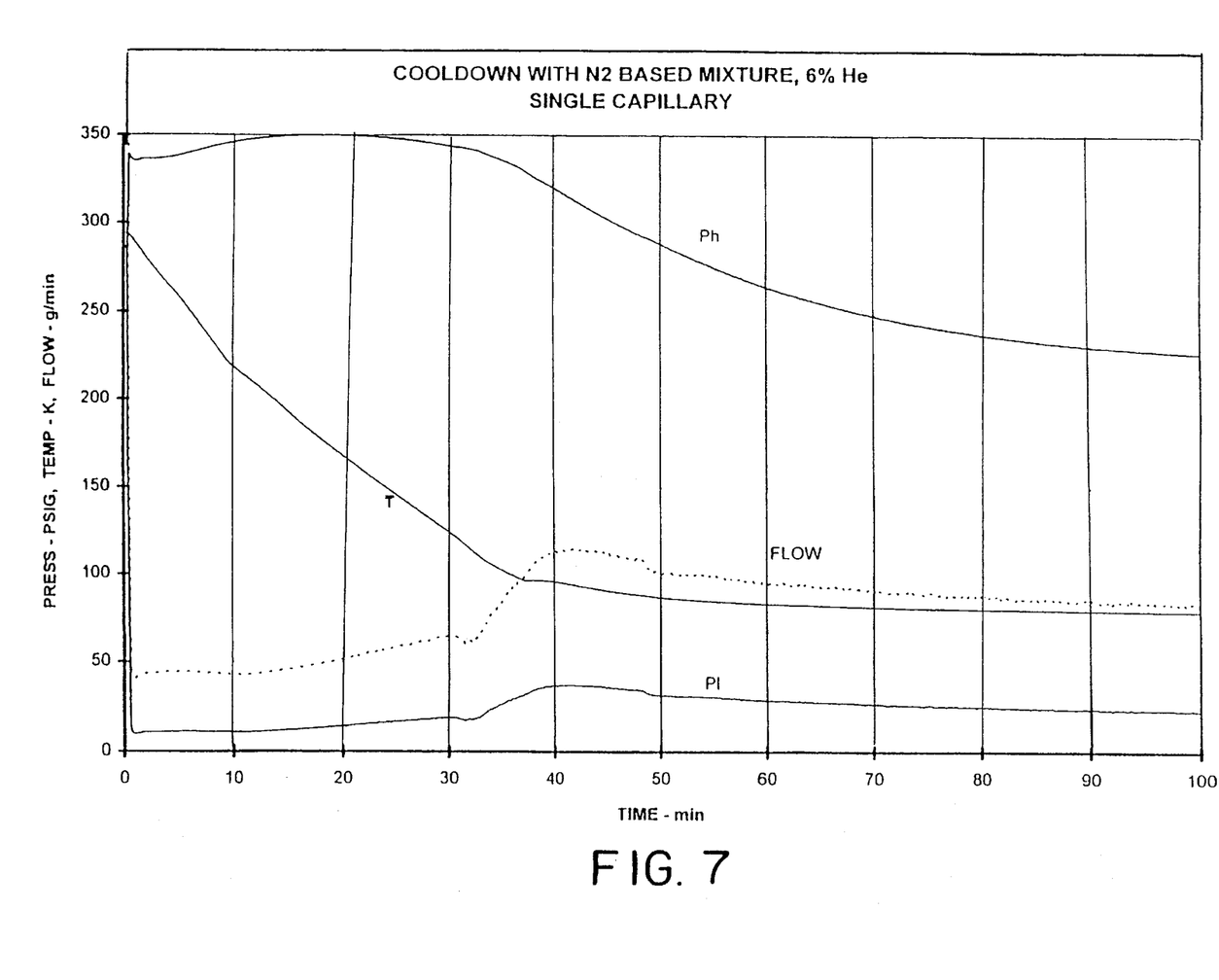
FIG. 7 is a graph similar to FIG. 3, with helium added to refrigerant mixture.
Figure 8:
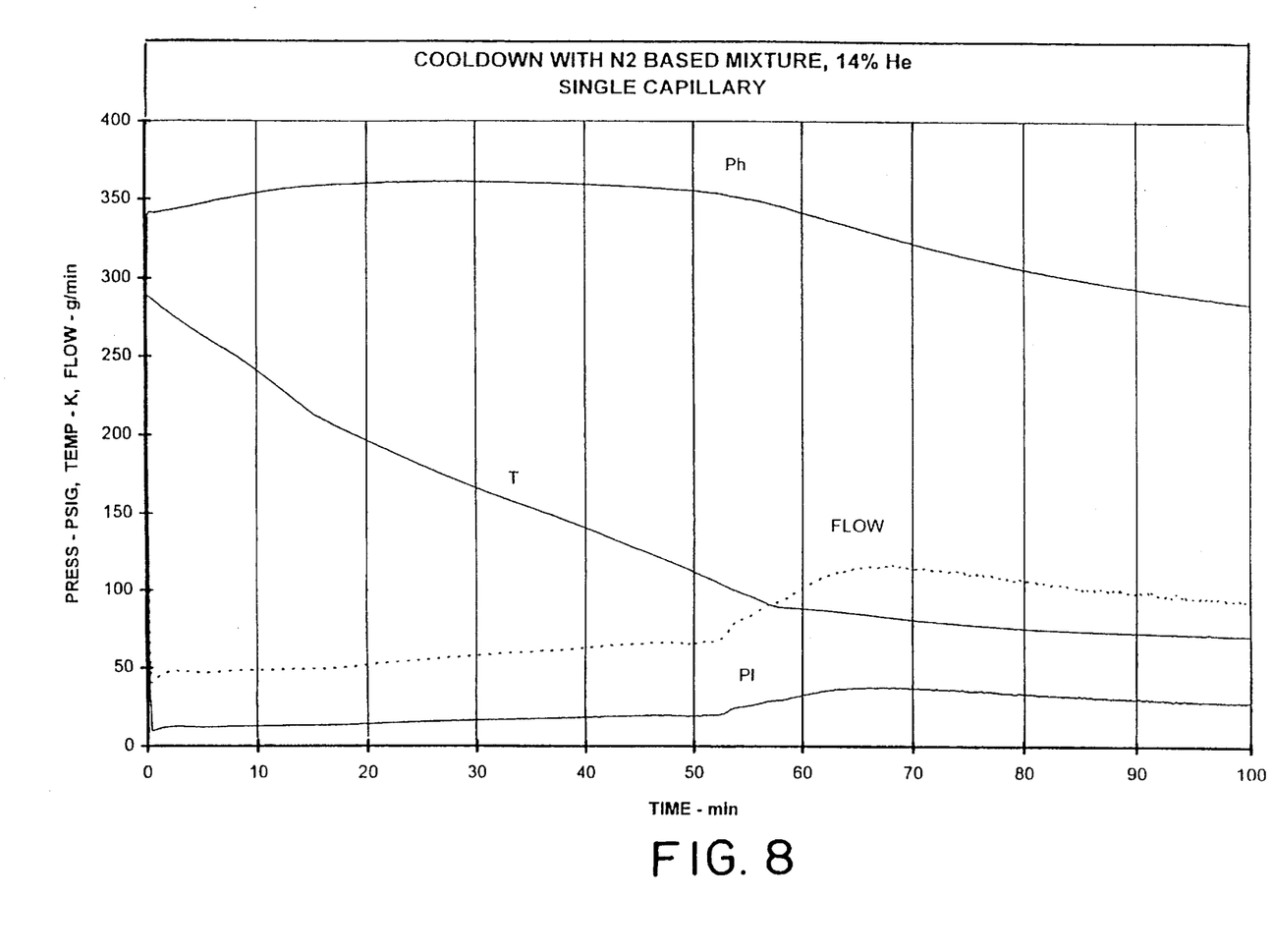
FIG. 8 is a graph similar to FIG. 7 with additional helium in the refrigerant mixture.

FIGS. 7 and 8 respectively provide cool-down test data corresponding to the solid lines, with helium, of FIG. 6. With 6% helium (FIG. 7), cool-down time is slightly less than the cool-down time in FIG. 3 where no helium was added. It is considered that cool-down time would have been substantially similar if the mechanical constructions had been identical for both tests. Actually, during the test shown in FIG. 3, the cold mass of the evaporator was slightly less than in the test of FIG. 7.

FIG. 8 illustrates that the addition of more helium, 14%, extended the cool-down time. This occurred because cooling effect is reduced by the addition of helium, but as illustrated in FIG. 6, a lower evaporator temperature is produced. FIGS. 7 and 8 also illustrate that the refrigerant flow rate and compressor return pressures do not increase as much when helium is added to the mixture as for the basic mixture of FIG. 3 without helium. The time needed to reach minimum temperature after the initial cool-down is extended by adding helium from about 20 minutes for the test in FIG. 3 to about 50 minutes for the test in FIGS. 7 and 8.

Thus, FIG. 6 demonstrates that it is possible to get the same cooling over the same temperature range with 6% helium and a fixed valve setting as with no helium in a basic refrigeration mixture in a system with a variable valve. The option of adding more helium produces lower temperatures with an increase in cool-down time, and a small reduction in maximum cooling capacity.

With this broad performance characteristic available in a fixed closed cycle system, a further improvement may be made in the refrigeration system by providing a small heater 38 (FIG. 4) near the evaporator 30 in a cryostat, and proximate the load (not shown) which is being cooled. The heater 38 is provided with an electrical current that varies in response to the load temperature as determined by a detector 40 positioned within the cryostat so that its temperature-responsive signals represent the temperature of the evaporator load. Thus, using temperature controller 42, which responds to the detector signals, the current of the heater 38 is varied automatically to maintain a more constant and precise load temperature.

In this way, the improved refrigerant mixture and the electrical heater 38 together provide, without need for a variable expansion device, a very stable load temperature in spite of any load variations on the refrigeration cycle, or any tendency for the refrigeration cycle to hunt for an exact operating point. In this way, a purely electrical temperature control system replaces mechanical control of the restrictor, whether effected manually or automatically.

Figure 9:
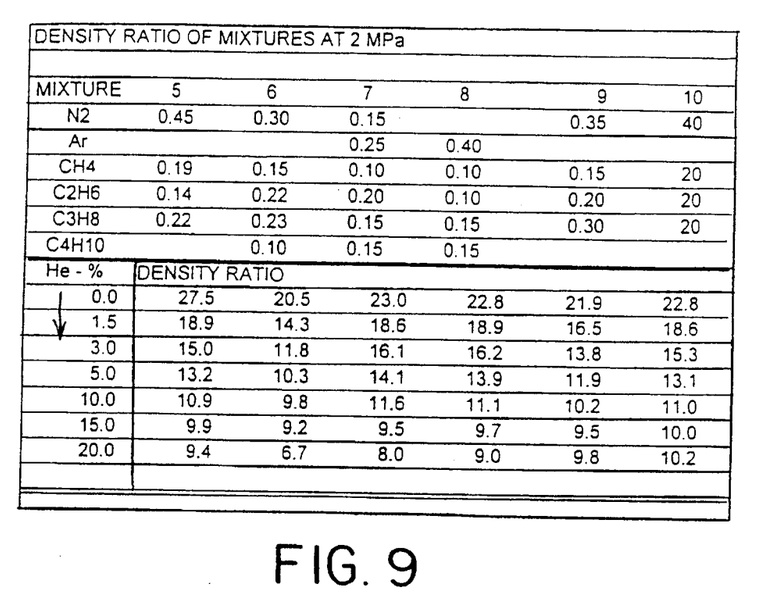
FIG. 9 is a tabulation of density ratio for refrigerant mixtures including helium in accordance with the invention.
Figure 10:
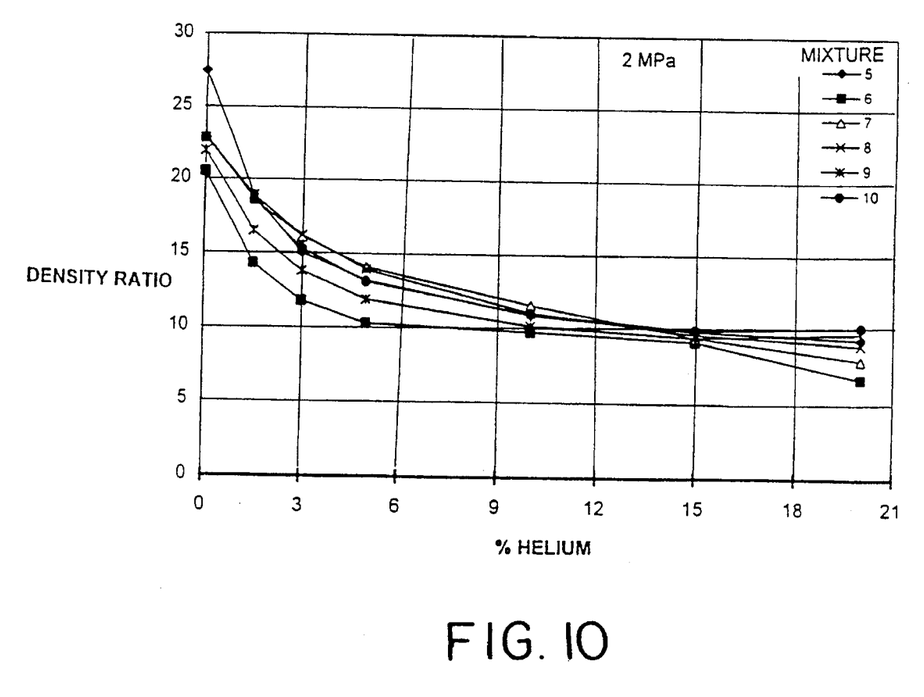
FIG. 10 is a graph of density ratio versus percentage helium for the data of FIG. 9.

FIG. 9 provides test results for basic mixtures Nos. 5–10 to which helium is added in different molar percentages. It can be seen from the table and in FIG. 10 where the data is plotted, that even the addition of as little as 1½% helium has a noteworthy effect on density ratio. However, 3% helium produces a major effect in reducing density ratio; at 20% helium the characteristic becomes substantially flattened in most instances.

A helium concentration of about 3% reduces the density ratio below 17 for all of the basic mixtures at 2 Mpa and 290K ambient. While increase in the helium concentration above about 15% continues to slightly reduce the density ratio in most instances, the cool-down time extends beyond 1.5 times the minimum possible cool-down time that is achieved with an adjustable valve without helium. However, the cool-down time with a fixed restrictor and helium in a mixture stays within 1½ times the minimum cool down time for the same helium mixture when using an adjustable valve. Thus, there is little performance penalty in exchange for a substantially simplified refrigerant flow control apparatus.

In summary, concentrations of helium up to about 25% can be beneficial in producing lower temperatures at the expense of cooling capacity. The basic mixtures listed in FIG. 9 before adding He, H2 and/or Ne, are all in 100% gaseous state at 290K, and are 100% liquid at the inlet to the restrictor device after cool-down when the system is operating in steady-state.

Figure 11:
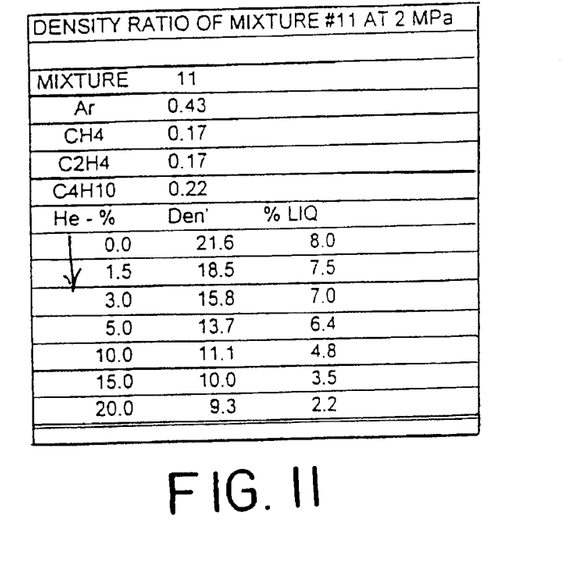
FIG. 11 is a tabulation of density ratios for an argon based mixture including helium.
Figure 12:
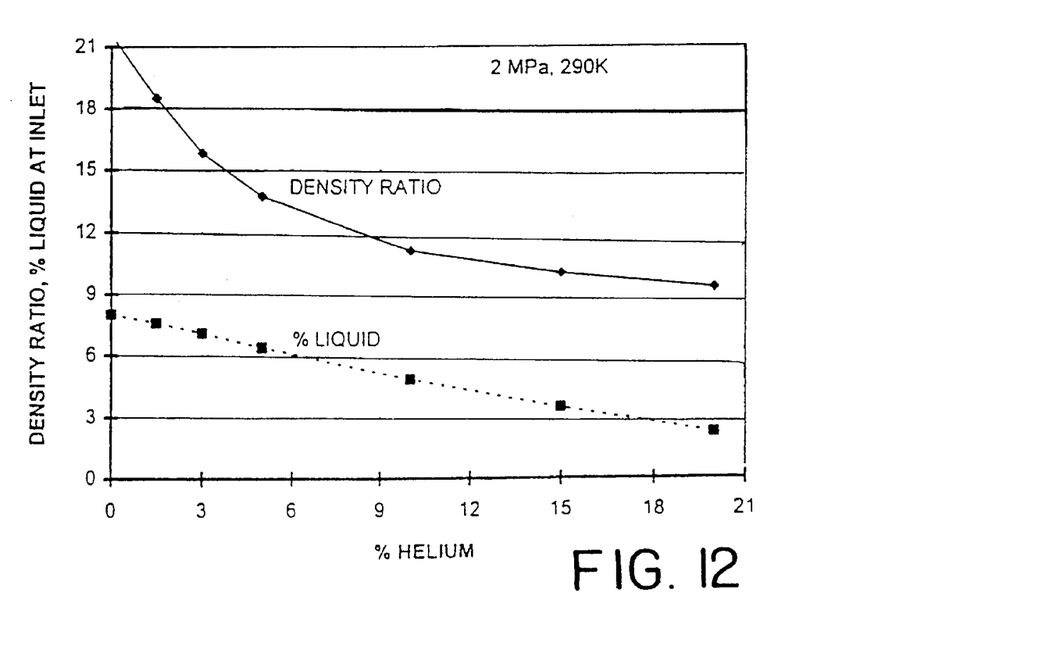
FIG. 12 is a graph of density ratio versus percentage helium for the data of FIG. 11.

As the concentration of C4H10 or C5H12 is increased, it is possible to have some liquid entering the warm end of the heat exchanger. This requires modification to the compressor. The oil separator 18 has to be between the compressor 12 and after-cooler 16. FIG. 11 gives the composition of a mixture No. 11 that has a high efficiency for producing refrigeration at about 120K. This mixture has sufficient C4H10 to form a liquid fraction at 290K and 2 Mpa. FIG. 12 shows the relations for density ratio and liquid fraction at the high pressure warm inlet end of the heat exchanger 26 as a function of helium concentration. Having some liquid enter the warm end of the heat exchanger, in itself, does not reduce the density ratio or the cool-down time significantly. More than 3% helium is needed to reduce the density ratio below 17 even though there is 7% (molar) liquid at the inlet.

Figure 13:
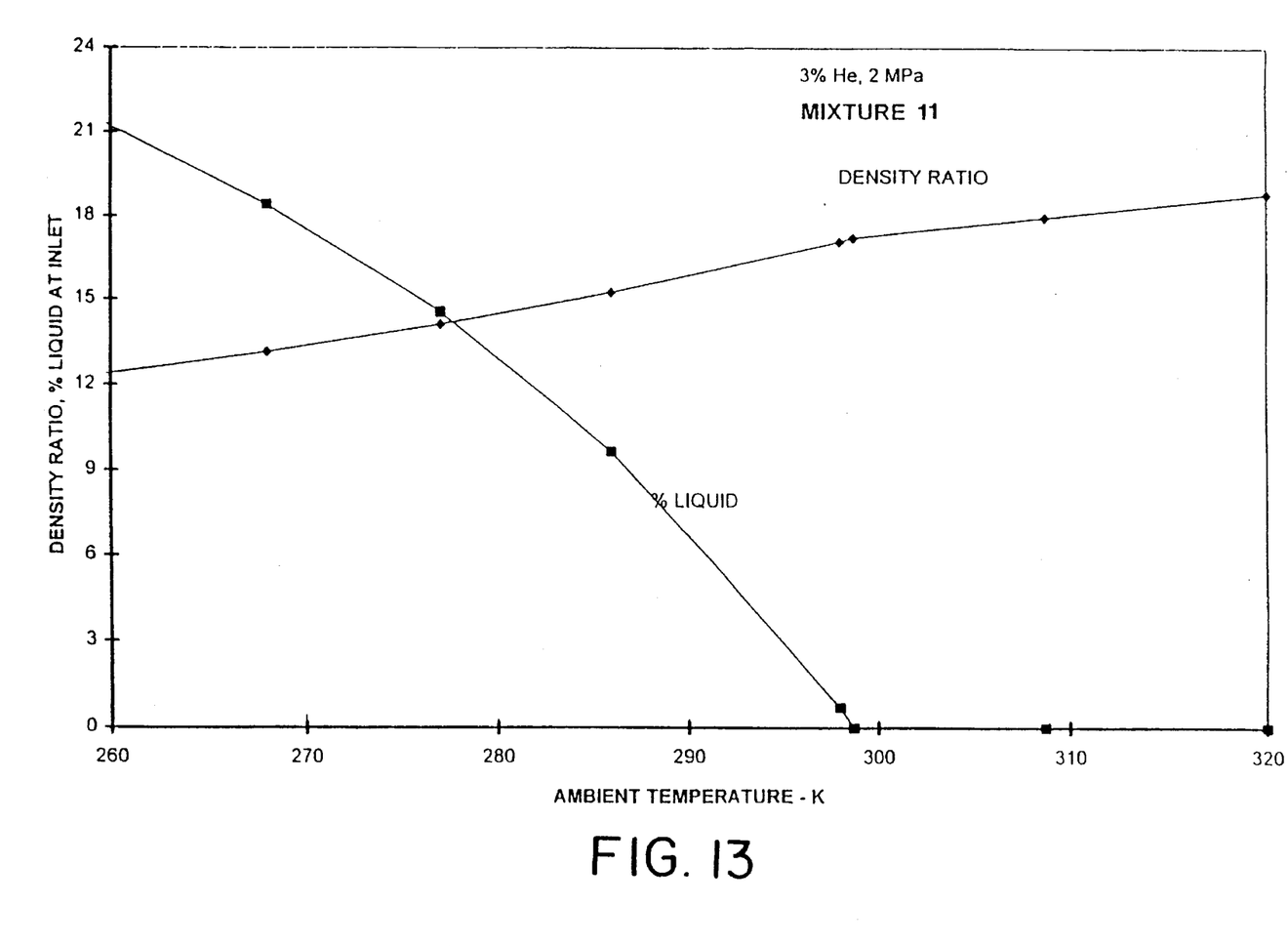
FIG. 13 is a graph of density ratio and liquid content versus ambient temperature for the data of FIG. 11.

FIG. 13 is a graph illustrating the change in density ratio and liquid fraction entering the warm end of the heat exchanger for mixture No. 11 as a function of ambient temperature. The after-cooler 16 and high pressure lines were cooled with ambient air circulation. Even with mixture No. 11, which has a large fraction of liquid entering the heat exchanger 26 and a minimal amount of helium, the density ratio remained in a range that will result in fast cool-down for ambient temperatures well above and well below a normal ambient of about 290K.

The mixtures in accordance with the invention are all those that have normal boiling temperatures above 77K, triple point temperatures below 125K, and can produce refrigeration in a temperature range of 77K to 120K with a return pressure to the compressor in a range of 0.1–0.4 Mpa, and a supply pressure at the compressor discharge in a range of 1.5 Mpa to 2.5 Mpa, with the after-cooler 16 operating near room temperature. These mixtures do not form a solid phase throughout the operational cycle. Components that are selected for the refrigerant mixtures are those that will not freeze out at 120K or warmer.

From test results it has been possible to divide the mixture components into three groups based on their normal boiling temperatures.

a) 20% to 75% gases whose normal boiling temperature is between 77K and 120K, and having triple point temperature less than 125K, whether separate or combined, b) 10% to 60% gases whose normal boiling temperature is between 120K and 200K, and having a triple point temperature less than 125K, separate or combined, c) 0% to 55% gases having normal boiling temperature above 200K, and having triple point temperature less than 125K, separate or combined.

To these basic mixtures are added 3%–25% of gases that are super-critical above 77K, namely, helium, hydrogen and/or neon.

With more specificity, nitrogen, carbon monoxide, argon, oxygen, methane and crypton can be used separately or in combination in a range of 20% to 75% for each component in conjunction with 3% to 25% of the gases helium, hydrogen and neon.

$CF_4$, $C2H4$, $C2H6$, $CClF_3$ and $CHF_3$, separately or combined, in the range of 10% to 60% of each component can be used with 3% to 25% helium, hydrogen and/or neon to accomplish the goals of the present invention.

Figure 14:
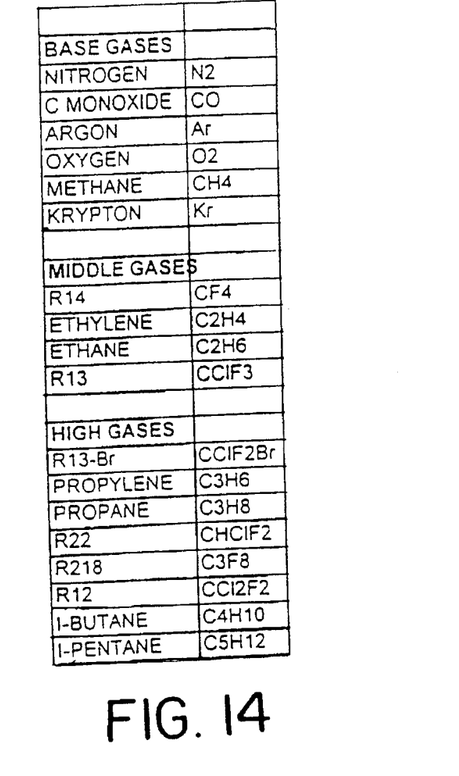
FIG. 14 is a tabulation of candidate components for use in refrigeration mixtures in systems in accordance with the invention.

FIG. 14 provides a partial list of gases with normal boiling temperatures above 77K and triple point temperatures less than 125K that can be included in a basic refrigeration mixture to which helium, hydrogen and/or neon may be added in accordance with the invention.

Figure 15:
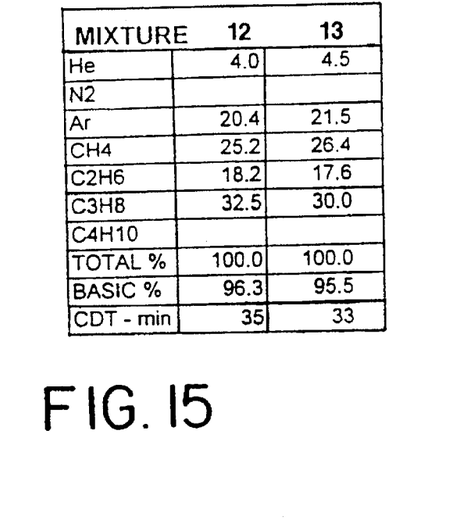
FIGS. 15 is a tabulation of cool-down times for argon based refrigerant mixtures.
Figure 16:
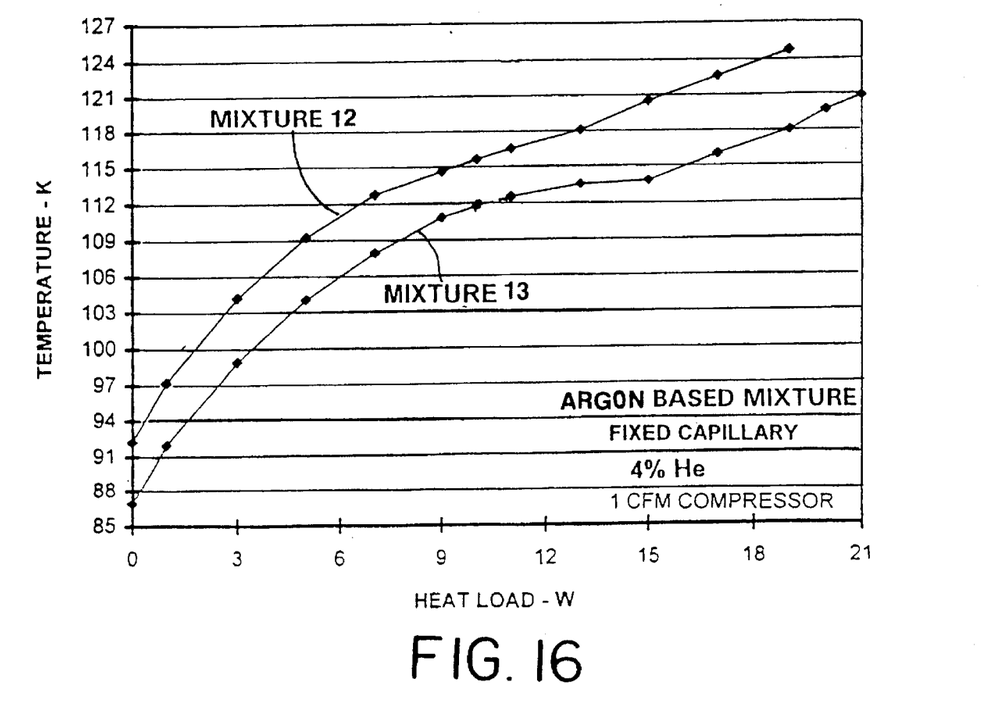
FIG. 16 is a graph of temperature versus heat load for the refrigerant mixtures of FIG. 15.

FIG. 15 provides data for argon based mixtures 12 and 13 in a fixed system to which helium is added in accordance with the invention, and FIG. 16 illustrates performance of these mixtures.

With regard to the fixed restrictor 28, a capillary tube is preferable because it is least sensitive to blockage by contaminants in the refrigerant. However, a fixed orifice, an adjustable valve with a fixed setting, or a high pressure heat exchanger tube which is shaped to form a restriction near the cold end (none shown), can be effective in implementing the concepts of the present invention.

Figure 17:
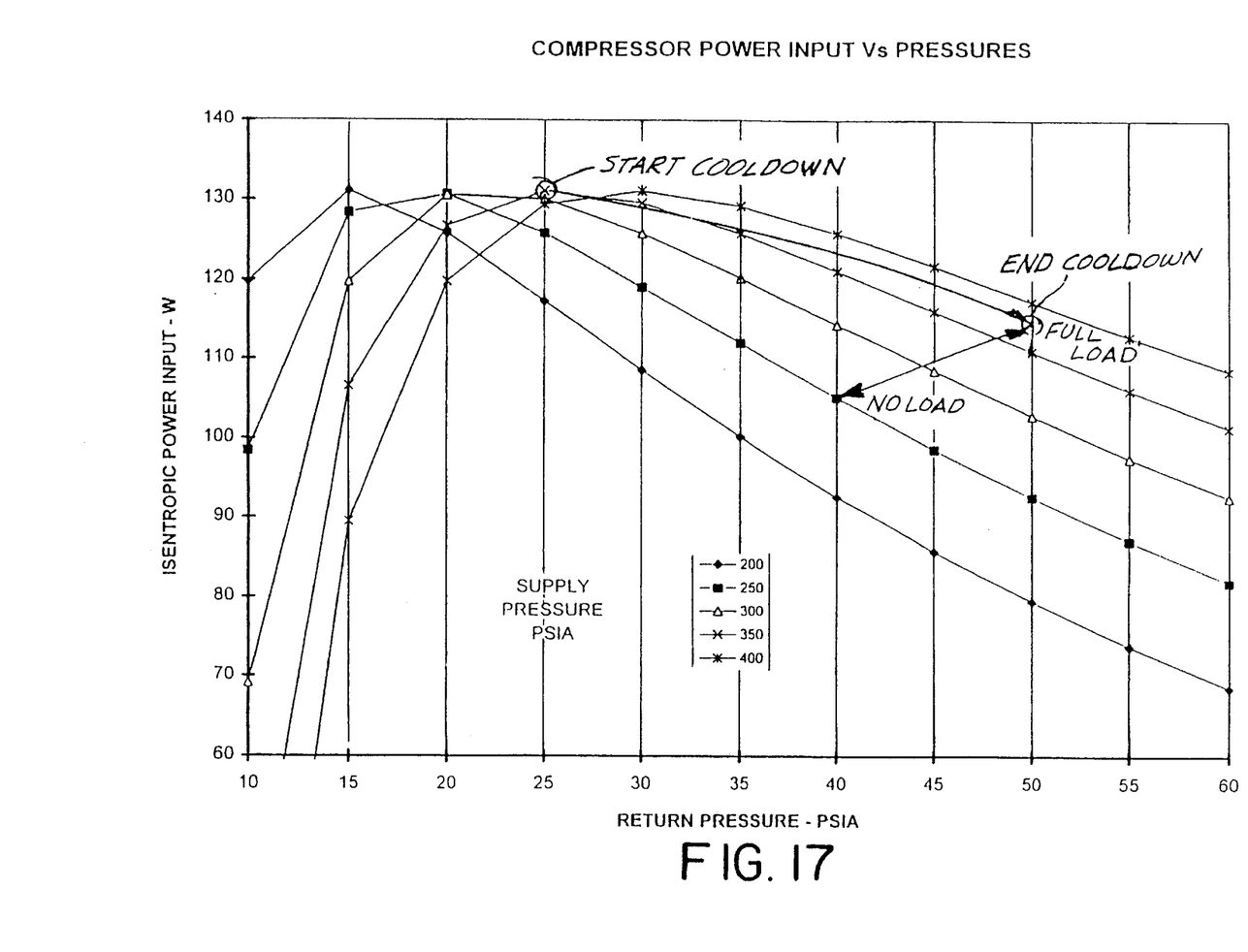
FIG. 17 is a graph of compressor power input versus compressor in and outlet pressures.

A preferred compressor, from the standpoint of cost and reliability, is a single stage, oil-lubricated compressor as described in the above-referenced patent No. 5,337,572. FIG. 17 is a plot of calculated isentropic power input for this compressor as a function of return and supply pressures. Actual power input is about 2.3 times greater than indicated in FIG. 17. Superimposed on FIG. 17 is a line showing how power changes during and after cool-down. Generally, cool-down time is minimized if the power input is maintained near the maximum that can be delivered. A system with a capillary tube as a throttle valve results in the power remaining near maximum throughout cool-down, which is advantageous.

Other types of compressors (not shown) that operate in the specified pressure range can also be used. Compressors having variable speed drives or variable displacements can be used. These features can be applied to further reduce cool-down time with a fixed throttle valve by increasing the rate of displacement to prevent the supply-return pressures from decreasing, and to operate at maximum power input. During steady state operation, a variable speed or displacement compressor can be used to reduce power input at low load.

It will thus be seen that the objects set forth above, among those made apparent from the preceding description, are efficiently attained and, since certain changes may be made in the above system without departing from the spirit and scope of the invention, it is intended that all matter contained in the above description and shown in the accompanying drawings shall be interpreted as illustrative and not in a limiting sense.

What is claimed is:

1. A closed cycle refrigerating system for steady-state cooling at a low cryogenic temperature and for cool-down from an elevated initial temperature toward said low cryogenic steady state temperature, comprising:

an evaporator for circulating a low pressure, low temperature cryogenic refrigerant therein, said evaporator absorbing heat from a load whereby said refrigerant is heated and said load is cooled;

a refrigerant compressor having a low pressure inlet in a range of 0.1 to 0.4 Mpa (1 to 4 atm) and a high pressure discharge in a range of 1.5 Mpa to 2.5 Mpa (15 to 25 Atm), said compressor receiving said heated low pressure refrigerant from said evaporator at said inlet and compressing said refrigerant to a high pressure at said discharge;

an after-cooler for receiving a flow of said compressed refrigerant from said compressor, removing heat from said high pressure refrigerant, and rejecting said heat from said refrigerating system;

a fixed restrictor having an outlet connected to an inlet of said evaporator, said fixed restrictor throttling said refrigerant flow from said high pressure to said low pressure, said refrigerant expanding through said restrictor and thereby becoming colder, said restrictor being fixed dimensionally and operative both for cool-down and for steady-state cooling;

a regenerative heat exchanger having a high pressure side and a low pressure side, said high pressure side and said low pressure side being in heat exchange relationship, said high pressure side connecting between an outlet of said after-cooler and an inlet to said fixed restrictor, said low pressure side connecting between an outlet of said evaporator and said low pressure inlet to said compressor;

said refrigerant being a mixture of refrigerant components having a density ratio in an approximate range of 7 to 17 during steady-state operation while maintaining an evaporator temperature in an approximate range of 70K to 120K, said ratio being between a density at the inlet to said fixed restrictor and a density at the high pressure inlet to said regenerative heat exchanger.

2. A refrigeration system as in claim 1, wherein said refrigerant is a mixture that includes at least one of He, H2 and Ne in a range of approximately 3% to 25%.

3. A refrigeration system as in claim 2, wherein said refrigerant mixture, without He, H2 and Ne, operates at steady-state with 100% liquid refrigerant at said fixed restrictor inlet.

4. A refrigeration system as in claim 2, wherein said refrigerant mixture includes approximately 20% to 75% of respective basic gaseous components with normal boiling temperature at 1 Atm between 77K and 120K and a triple point less than 125K for said components separately or combined.

5. A refrigeration system as in claim 4, wherein said basic components include 20% to 75% of at least one of N2, CO, Ar, $O_2$, $CH_4$ and Kr.

6. A refrigeration system as in claim 4, wherein said basic components include 10% to 60% of at least one of $CF_4$, $C_2H_4$, $C_2H_6$ and $CClF_3$.

7. A refrigeration system as in claim 4, wherein said at least one of He, H2 and Ne, adjusts said density ratio.

8. A refrigeration system as in claim 2, wherein said refrigerant includes approximately 10% to 60% of respective basic gaseous components with normal boiling temperature between 120K and 200K, and a triple point less than 125K for said components separately or combined.

9. A refrigeration system as in claim 8, wherein said at least one of He, H2 and Ne adjusts said density ratio.

10. A refrigeration system as in claim 2, wherein said refrigerant includes approximately 0% to 55% of respective basic gaseous components with normal boiling temperature above 200K, and a triple point less than 125K for said components separately or combined.

11. A refrigeration system as in claim 2, wherein said at least one of He, H2 and Ne, adjusts said density ratio.

12. A refrigeration system as in claim 2, wherein said refrigerant mixture is 100% gaseous at said inlet of said fixed restrictor a start of cool-down.

13. A refrigeration system as in claim 4, wherein said basic components include 0% to 55% of at least one of $CClF_2Br$, $C_3H_6$, $C_3H_8$, $CHClF_2$, $C_3F_8$, $CCl_2F_2$, $C_4H_{10}$ and $C_5H_{12}$.

14. A refrigeration system as in claim 1, wherein said refrigerant compressor is single stage and has a volumetric efficiency greater than 50% at a pressure ratio greater than 4.

15. A refrigeration system as in claim 1, wherein said refrigeration compressor is oil lubricated, said refrigeration system further comprising a high pressure side oil separator, said oil separator having an inlet connected at one of said compressor discharge and said after-cooler outlet.

16. A refrigeration system as in claim 1, wherein said compressor has a variable pumping capacity, said capacity being varied by changing at least one of compressor speed and displacement, whereby said low pressure at said compressor inlet is varied.

17. A closed cycle refrigeration system as in claim 1, wherein said after-cooler includes an air-cooled heat exchanger for operation with air at ambient temperature.

18. A refrigeration system as in claim 1, wherein said heat exchange relationship in said regenerative heat exchanger is counterflow.

19. A refrigerating system as in claim 1, further comprising:

a heater of variable output for positioning close to said evaporator load;

temperature detection means for positioning close to said load and for providing a signal indicative of load temperature;

control means for receiving said signal from said detection means and for controlling said heater output in relation to said signal to maintain a steady load temperature.

20. A closed cycle refrigerating system for steady-state cooling at a low cryogenic temperature and for cool-down from an elevated initial temperature toward said low cryogenic steady state temperature, comprising:

an evaporator for circulating a low pressure, low temperature cryogenic refrigerant therein, said evaporator absorbing heat from a load whereby said refrigerant is heated and said load is cooled;

a refrigerant compressor having a low pressure inlet in a range of 0.1 to 0.4 Mpa and a high pressure discharge in a range of 1.5 Mpa to 2.5 Mpa, said compressor receiving said heated low pressure refrigerant from said evaporator at said inlet and compressing said refrigerant to a high pressure at said discharge;

heat transfer means for receiving a flow of said compressed refrigerant from said compressor, removing heat from said high pressure refrigerant, and rejecting at least a portion of said heat from said refrigerating system, high pressure cooled refrigerant leaving said heat transfer means, a fixed restrictor having an inlet receiving said cooled refrigerant from said heat transfer means and an outlet connected to an inlet of said evaporator, said fixed restrictor throttling said refrigerant flow from said high pressure to said low pressure, said refrigerant expanding through said restrictor and thereby becoming cold, said restrictor being fixed dimensionally and operative both for cool-down and for steady-state cooling, said refrigerant being a mixture of refrigerant components having a density ratio in an approximate range of 7 to 17 during operation while maintaining an evaporator temperature in an approximate range of 70K to 120K, said ratio being between a refrigerant density at the inlet to said fixed restrictor at steady-state and a refrigerant density at the inlet to said fixed restrictor at a start of cool-down.

21. A refrigeration system as in claim 20, wherein said refrigerant is a mixture that includes at least one of He, H2 and Ne in a range of approximately 3% to 25%.

22. A refrigeration system as in claim 21, wherein said refrigerant mixture, without He, H2 and Ne, operates at steady-state with 100% liquid refrigerant at said fixed restrictor inlet.

\* \* \* \* \*